(12) United States Patent
Tokunaga et al.

(10) Patent No.: US 11,244,235 B2
(45) Date of Patent: Feb. 8, 2022

(54) DATA ANALYSIS DEVICE AND ANALYSIS METHOD

(71) Applicant: Hitachi, Ltd., Tokyo (JP)

(72) Inventors: Kazuaki Tokunaga, Tokyo (JP); Syunsuke Monai, Hitachi (JP)

(73) Assignee: HITACHI, LTD., Tokyo (JP)

( * ) Notice: Subject to any disclaimer, the term of this patent is extended or adjusted under 35 U.S.C. 154(b) by 842 days.

(21) Appl. No.: 15/557,542

(22) PCT Filed: Sep. 16, 2015

(86) PCT No.: PCT/JP2015/076363
§ 371 (c)(1),
(2) Date: Sep. 12, 2017

(87) PCT Pub. No.: WO2017/046906
PCT Pub. Date: Mar. 23, 2017

(65) Prior Publication Data
US 2018/0046927 A1    Feb. 15, 2018

(51) Int. Cl.
*G06N 5/04* (2006.01)
*G06F 16/00* (2019.01)
(Continued)

(52) U.S. Cl.
CPC .............. *G06N 5/045* (2013.01); *G06F 16/00* (2019.01); *G06F 16/245* (2019.01); *G06N 5/025* (2013.01)

(58) Field of Classification Search
CPC ...... G06N 5/045; G06N 5/025; G06F 16/245; G06F 16/00
See application file for complete search history.

(56) References Cited

U.S. PATENT DOCUMENTS

| | | | |
|---|---|---|---|
| 8,417,654 B1 * | 4/2013 | Cao | G06Q 30/02 706/14 |
| 9,973,520 B2 * | 5/2018 | Pevny | G06N 5/045 |

(Continued)

FOREIGN PATENT DOCUMENTS

| | | |
|---|---|---|
| JP | 2000-222486 A | 8/2000 |
| JP | 2006-048129 A | 2/2006 |

OTHER PUBLICATIONS

Gisung Kim, Seungmin Lee, and Sehun Kim, "A novel hybrid intrusion detection method integrating anomaly detection with misuse detection", Available online Aug. 31, 2013, Expert Systems with Applications 41, pp. 1690-1700. (Year: 2013).*

(Continued)

*Primary Examiner* — Kamran Afshar
*Assistant Examiner* — Ying Yu Chen
(74) *Attorney, Agent, or Firm* — Mattingly & Malur, PC (57) ABSTRACT

A data analysis device that analyzes data having a record including an objective variable and a plurality of explanatory variables includes a node generating unit that generates a node specified by a condition of the explanatory variable on the basis of the objective variable and the explanatory variable of the record and associating the record with the node, an evaluation value generating unit that generates a proportion of the number of records whose target value is the objective variable among a plurality of records associated with the node as an evaluation value, and a parameter extracting unit that selects a node on the basis of the evaluation value and extracts and outputs the condition of the explanatory variable related to the selected node.

8 Claims, 7 Drawing Sheets

| STATE | RULES WITH HIGH HITTING RATE | | | | |
|---|---|---|---|---|---|
| ABNORMAL | 'D' > 104.9 | 'D' ≦ 104.9 and 'A' > 19.9 and 'A' ≦ 20.1 and 'C' > 9.9 and 'B' ≦ 4.9 | | | |
| NORMAL | 'D' ≦ 104.9 and 'A' ≦ 19.9 | 'D' ≦ 104.9 and 'A' > 20.1 | 'D' ≦ 104.9 and 'A' > 19.9 and 'A' ≦ 20.1 and 'C' ≦ 9.9 | 'D' ≦ 104.9 and 'A' > 19.9 and 'A' ≦ 20.1 and 'C' > 9.9 and 'B' > 4.9 | |

90  91                                    92

(51) Int. Cl.
  *G06F 16/245*  (2019.01)
  *G06N 5/02*  (2006.01)

(56) References Cited

U.S. PATENT DOCUMENTS

| | | |
|---|---|---|
| 2006/0026187 A1 | 2/2006 | Hatano et al. |
| 2015/0127589 A1* | 5/2015 | Lakshmanan .......... G06N 20/00 706/12 |
| 2016/0021122 A1* | 1/2016 | Pevny .................... G06N 5/025 726/23 |
| 2017/0076307 A1* | 3/2017 | Motohashi ............. G06N 7/005 |

OTHER PUBLICATIONS

C. Xiang and S. M. Lim, "Design of Multiple-Level Hybrid Classifier for Intrusion Detection System", 2005, 2005 IEEE Workshop on Machine Learning for Signal Processing, pp. 117-122. (Year: 2005).*
Japanese Office Action received in corresponding Japanese Application No. 2017-540404 dated Oct. 9, 2018.
International Search Report of PCT/JP2015/076363 dated Dec. 22, 2015.

* cited by examiner

| | 20 21 | 22 | 23 | 24 | 25 | 26 |
|---|---|---|---|---|---|---|
| | ID | SENSOR A | SENSOR B | SENSOR C | SENSOR D | STATE |
| | 1 | 19.9 | 4.9 | 10.1 | 101.9 | NORMAL |
| | 2 | 20.1 | 5.1 | 10.1 | 101.9 | NORMAL |
| | 3 | 20.1 | 4.9 | 10.1 | 101.9 | ABNORMAL |
| | 4 | 20.3 | 5.1 | 10 | 101.6 | NORMAL |
| | 5 | 21.3 | 3.3 | 8.1 | 105.5 | ABNORMAL |
| | 6 | 20.8 | 3.3 | 9.8 | 104.9 | NORMAL |
| | 7 | 20.1 | 4.9 | 9.9 | 101.9 | NORMAL |
| | 8 | 25.3 | 5.1 | 9.3 | 101.9 | NORMAL |
| | 9 | 24.4 | 4.9 | 9.8 | 98.3 | NORMAL |
| | 10 | 21.9 | 5.2 | 10.5 | 100.1 | NORMAL |
| | ... | ... | ... | ... | ... | ... |
| | 40 | 22.3 | 4.0 | 9.5 | 105.1 | ABNORMAL |

| Node ID (41) | CONDITION STATEMENT (42) | HIERARCHICAL DEPTH (43) | NUMBER OF RECORDS (44) | NUMBER OF ABNORMAL RECORDS (45) | NUMBER OF NORMAL RECORDS (46) | PARENT NODE (47) |
|---|---|---|---|---|---|---|
| 0 |  | 0 | 40 | 8 | 32 | — |
| 1 | 'D' ≦ 104.9 | 1 | 36 | 4 | 32 | 0 |
| 3 | 'D' ≦ 104.9 and 'A' ≦ 19.9 | 2 | 7 | 0 | 7 | 1 |
| 4 | 'D' ≦ 104.9 and 'A' > 19.9 and 'A' ≦ 20.1 | 2 | 9 | 4 | 5 | 1 |
| 6 | 'D' ≦ 104.9 and 'A' > 19.9 and 'A' ≦ 20.1 and 'C' ≦ 9.9 | 3 | 4 | 0 | 4 | 4 |
| 7 | 'D' ≦ 104.9 and 'A' > 19.9 and 'A' ≦ 20.1 and 'C' > 9.9 | 3 | 5 | 4 | 1 | 4 |
| 8 | 'D' ≦ 104.9 and 'A' > 19.9 and 'A' ≦ 20.1 and 'C' > 9.9 and 'B' ≦ 4.9 | 4 | 4 | 4 | 0 | 7 |
| 9 | 'D' ≦ 104.9 and 'A' > 19.9 and 'A' ≦ 20.1 and 'C' > 9.9 and 'B' > 4.9 | 4 | 1 | 0 | 1 | 7 |
| 5 | 'D' ≦ 104.9 and 'A' > 20.1 | 2 | 20 | 0 | 20 | 1 |
| 2 | 'D' > 104.9 | 1 | 4 | 4 | 0 | 0 |

| Node ID (61) | Condition Statement (62) | Hierarchical Depth (63) | Number of Records (64) | Coverage Rate [%] (65) | Abnormal Hitting Rate [%] (66) | Abnormal Adaptation Rate [%] (67) | Number of Abnormal Records (68) | Normal Hitting Rate [%] (69) | Normal Adaptation Rate [%] (70) | Number of Normal Records (71) |
|---|---|---|---|---|---|---|---|---|---|---|
| 0 |  | 0 | 40 | 100 | 20.0 | 20.0 | 8 | 80.0 | 80.0 | 32 |
| 1 | 'D' ≦ 104.9 | 1 | 36 | 90.0 | 11.1 | 10.0 | 4 | 88.9 | 80.0 | 32 |
| 3 | 'D' ≦ 104.9 and 'A' ≦ 19.9 | 2 | 7 | 17.5 | 0 | 0 | 0 | 100 | 17.5 | 7 |
| 4 | 'D' ≦ 104.9 and 'A' ≧ 19.9 and 'A' ≦ 20.1 | 2 | 9 | 22.5 | 44.4 | 10 | 4 | 55.6 | 12.5 | 5 |
| 6 | 'D' ≦ 104.9 and 'A' ≧ 19.9 and 'A' ≦ 20.1 and 'C' ≦ 9.9 | 3 | 4 | 10.0 | 0 | 0 | 0 | 100 | 10.0 | 4 |
| 7 | 'D' ≦ 104.9 and 'A' ≧ 19.9 and 'A' ≦ 20.1 and 'C' ≧ 9.9 | 3 | 5 | 12.5 | 80.0 | 10.0 | 4 | 20.0 | 2.5 | 1 |
| 8 | 'D' ≦ 104.9 and 'A' ≧ 19.9 and 'A' ≦ 20.1 and 'C' ≧ 9.9 and 'B' ≦ 4.9 | 4 | 4 | 10.0 | 100 | 10.0 | 4 | 0 | 0 | 0 |
| 9 | 'D' ≦ 104.9 and 'A' ≧ 19.9 and 'A' ≦ 20.1 and 'C' ≧ 9.9 and 'B' ≧ 4.9 | 4 | 1 | 2.5 | 0 | 0 | 0 | 100 | 2.5 | 1 |
| 5 | 'D' ≦ 104.9 and 'A' ≧ 20.1 | 2 | 20 | 50.0 | 0 | 0 | 0 | 100 | 50.0 | 20 |
| 2 | 'D' > 104.9 | 1 | 4 | 10.0 | 100 | 10.0 | 4 | 0 | 0 | 0 |

| STATE | RULES WITH HIGH HITTING RATE | | | | |
|---|---|---|---|---|---|
| ABNORMAL | 'D' > 104.9 | 'D' ≦ 104.9 and 'A' > 19.9 and 'A' ≦ 20.1 and 'C' > 9.9 and 'B' ≦ 4.9 | | | |
| NORMAL | 'D' ≦ 104.9 and 'A' ≦ 19.9 | 'D' ≦ 104.9 and 'A' > 20.1 | 'D' ≦ 104.9 and 'A' > 19.9 and 'A' ≦ 20.1 and 'C' ≦ 9.9 | 'D' ≦ 104.9 and 'A' > 19.9 and 'A' ≦ 20.1 and 'C' > 9.9 and 'B' > 4.9 | |

DATA ANALYSIS DEVICE AND ANALYSIS METHOD

TECHNICAL FIELD

The present invention relates to a data analysis device and an analysis method.

BACKGROUND ART

There is a demand for analysis of states of various systems or outputs thereof including an interim result. There is a control system as an example of a system whose state is required to be analyzed, and it is necessary to analyze the system state in order to cope with a failure thereof, a control failure in which a control result is different from a predetermined control result, or the like. There is a sales management system as an example of a system whose output is required to be analyzed, and in order to revise or make a sales plane, it is necessary to analyze an output including an interim result such as a sales item or a sales amount thereof in association with a customer preference and a sales timing (a time, a day of week, a month, or the like). This demand includes accurate analysis.

As a technical background responding to such a demand, there are an improvement in CPU capabilities of computers and size reduction and capacity increase of storage devices. Further, size reduction and precision increase of various types of sensors are a technical background responding to such a demand as well.

Under the technical background, when various kinds of data obtained from systems are used as analysis targets, the accuracy of analysis of the states or the outputs of the system are expected to be improved. One of techniques for meeting this expectation is described in Patent Document 1.

Patent Document 1 discloses a technique of generating a decision tree corresponding to a classification rule inherent in data and adding data of a new attribute to a classification rule with a low classification accuracy to thereby improve the classification accuracy.

CITATION LIST

Patent Document

Patent Document 1: JP 2006-48129 A

SUMMARY OF THE INVENTION

Problems to be Solved by the Invention

As described in Patent Document 1, it is useful to use a decision tree which is a sort of modeling to find out the classification rule inherent in the data. However, if the technique disclosed in Patent Document 1 is used for analysis of a state or an output of a system in which data having various kinds of attributes is generated, there is a problem in that the decision tree is too complicated. In order to solve this problem, the decision tree is trimmed. For example, when the number of attribute types of data used in a node or the number of layers of a tree is set, a leaf node is trimmed, and the decision tree is simplified.

In the technique disclosed in Patent Document 1, when the number of attribute types of data is limited, and a desired classification accuracy is not obtained, the number of attribute types of data is increased, and so one combination of attributes of data constituting a classification rule is obtained.

In complicated systems, a state or an output is not necessarily specified by one rule. For example, an attribute of data reflecting a cause of abnormality of a system or a combination of attributes is not necessarily limited to one attribute or combination. In other words, in order to improve the accuracy, a plurality of possible important rules should not be overlooked.

In this regard, a data analysis device is required to visualize a rule for classifying data while solving complication of modeling from a point of view of a user.

Solutions to Problems

A data analysis device that analyzes data having a record including an objective variable and a plurality of explanatory variables includes a node generating unit that generates a node specified by a condition of the explanatory variable on the basis of the objective variable and the explanatory variable of the record and associating the record with the node, an evaluation value generating unit that generates a proportion of the number of records whose target value is the objective variable among a plurality of records associated with the node as an evaluation value, and a parameter extracting unit that selects a node on the basis of the evaluation value and extracts and outputs the condition of the explanatory variable related to the selected node.

Effects of the Invention

According to the disclosed invention, it is possible to visualize a rule for classifying data easily.

MODE FOR CARRYING OUT THE INVENTION

Figure 1:
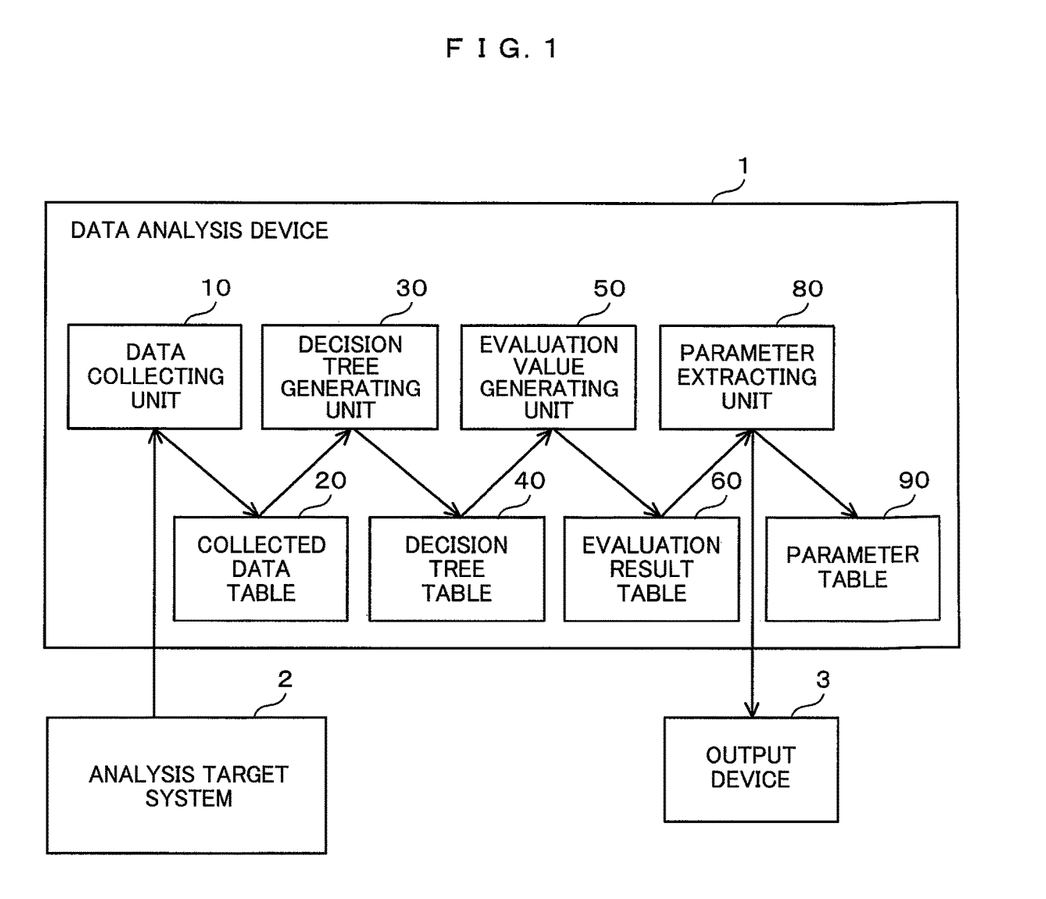
FIG. 1 is a configuration diagram of a data analysis device.

FIG. 1 is a configuration diagram of a data analysis device 1. The data analysis device 1 is connected with an analysis target system 2 such as a control system or a sales management system and is connected with an output device 3 which outputs a data analysis result.

The data analysis device 1 includes processing units such as a data collecting unit 10, a decision tree generating unit 30, an evaluation value generating unit 50, and a parameter extracting unit 80 and tables such as a collected data table 20, a decision tree table 40, an evaluation result table 60, and a parameter table 90. The data analysis device 1 is a computer including a processing device that executes the processing units and a storage device that stores the tables. For example, each of the processing units is configured with a program running on a central processing unit (CPU), and each of the tables is configured with a database stored in the storage device.

Records of data collected from the analysis target system by the data collecting unit 10 are associated with nodes of a decision tree defining nodes on the basis of a condition related to data collected by the decision tree generating unit 30. The evaluation value generating unit 50 classifies the records into records belonging to respective nodes on the basis of the condition related to the data, further classifies the records into records corresponding to aspects of objective variables of the decision tree included in the data, and generates a proportion of the number of further classified records to the number of records belonging to each node as an evaluation value. The parameter extracting unit extracts the condition related to the data corresponding to the aspect of the objective variable on the basis of a predetermined criterion related to the generated evaluation value and outputs the extracted condition. The respective processing units operate as follows to execute the process of the data analysis device 1.

The data collecting unit 10 stores the data collected from the analysis target system 2 in the collected data table 20. The decision tree generating unit 30 generates a decision tree from the records of the collected data table 20 and stores the generated decision tree in the decision tree table 40. The evaluation value generating unit 50 calculates evaluation values of respective nodes of the decision tree and generates the evaluation result table 60 in which the evaluation values are added to the decision tree table 40. The parameter extracting unit 80 extracts a parameter (data attribute) indicating a feature inherent in the collected data with reference to the evaluation result table 60, stores the extracted parameter in the parameter table 90, and outputs the parameter to the output device 3.

Examples of the output device 3 include a communication device for performing an output to a network, a display for displaying, a terminal including a display, and a printer for printing.

Figure 2:
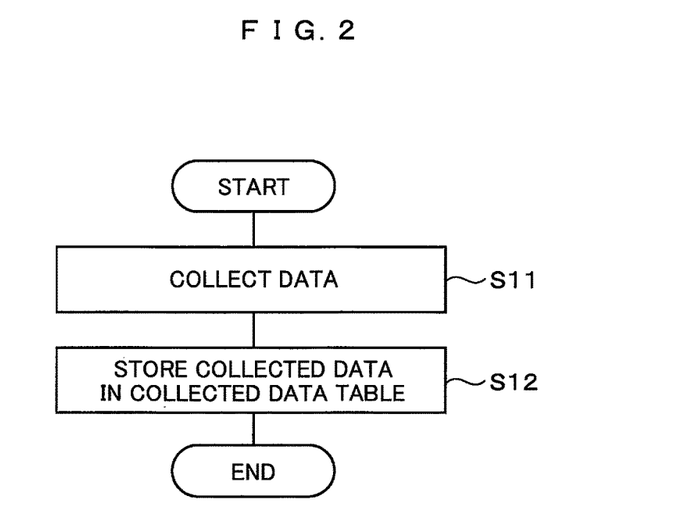
FIG. 2 is a processing flowchart of a data collecting unit.

FIG. 2 is a processing flowchart of the data collecting unit 10. The data collecting unit 10 collects data from the analysis target system 2 (S11) and stores the collected data in the collected data table 20 (S12).

When the analysis target system 2 is a control system, the data to be collected is sensor data in a broad sense. In the broad sense, the sensor data also includes data such as a control target value set by a control device or an abnormality detection output of an abnormality detection device in addition to data of a sensor such as a thermometer or an ammeter. The sensor data is output from each sensor with a cycle of 100 ms, 1 second, or the like on the basis of a timer (clock) of the analysis target system 2. There is also sensor data which is output in response to the occurrence of an event such as abnormal detection event such as the abnormality detection output of the abnormality detection device. The sensor data is associated with time data (time stamp) indicating a time output from each sensor. The data collecting unit 10 may collect the data from each sensor in accordance with an output cycle or may collect the data by collectively receiving sensor data temporarily accumulated in the analysis target system 2.

When the analysis target system 2 is an information processing system such as a sales management system, data to be collected is log data which is output from the information processing system periodically or in response to an occurred event. The log data also includes a time stamp. Therefore, the log data output in accordance with a type of log such as data reception of the information processing system, data writing to a storage device, or a program execution state can be dealt as the sensor data when the type of log is regarded as a sensor. In the following example, regardless of a type of the analysis target system 2, data to be collected can be dealt with in a similar manner as the sensor data, and the description will proceed with the sensor data for the sake of simplicity.

Figure 3:
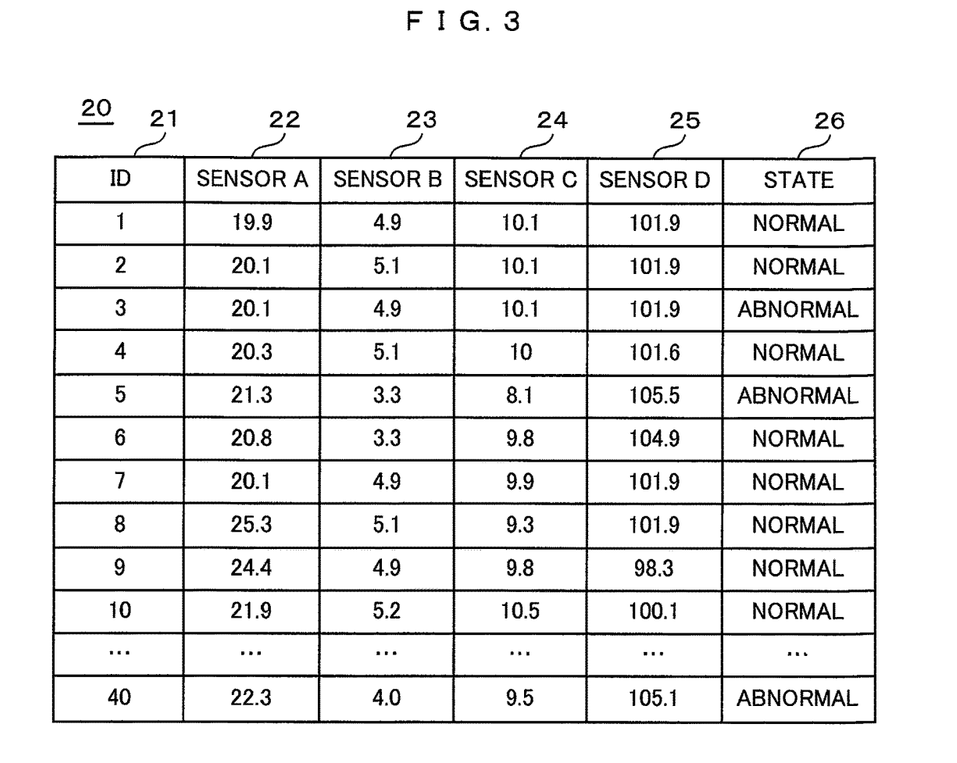
FIG. 3 is a configuration example of a collected data table.

FIG. 3 illustrates a configuration example of the collected data table 20. The collected data table 20 includes an ID 21 identifying each record and sensor data 22 to 25 collected from respective sensors. A state 26 indicates an abnormality detection output when the abnormality detection device is regarded as a sensor. In the example described below, the sensor data 22 to 25 are dealt as explanatory variables in decision tree analysis, and the state 26 is dealt as an objective variable. Since the decision tree analysis is well known, description thereof will be omitted.

When the analysis target system 2 is a control system, among the sensor data 22 to 25 included in the records of the collected data table 20, sensor data obtained at the same time or within a predetermined time (for example, $\frac{1}{10}$ of a cycle) from a reference time regarded as the same time is associated. The reference time may be the time of the timer (clock), but time data (time stamp) of a specific sensor whose sensor data is collected in the collected data table 20 may be used.

Further, when the analysis target system 2 is a process management system in which medicinal substances are sequentially mixed and combined, and an medicinal substance insertion amount and a final component ratio of the medicinal substances are obtained as sensor data, since a stirring time and a reaction time are known in advance, correction (of advancing or delaying time data of the sensor data) may be performed at those times, and resulting sensor data may be sorted as the sensor data of the same time.

In a record with the ID 21 of "1," the sensor data 22 obtained from a sensor A is "19.9," the sensor data 23 obtained from a sensor B is "4.9," . . . , and the state 26 is "normal." Here, in order to facilitate the following description, a unit of each sensor data in the collected data table 20 is omitted, and the number of records is assumed to be 40.

Further, in order to simplify the description, the state 26 serving as the objective variable is indicated by two states (aspects of the objective variable), that is, character strings "normal" or "abnormal." The state may be 3 or more states depending on the analysis target system 2. For example, in a control system in which it is possible to indicate three or more states of the analysis target system 2 through a state transition diagram, it is possible to select each state of the state transition diagram. Further, when the analysis target system 2 is a sales management system, it is possible to select various states such as a state in which the sales of a specific item is growing, a state in which the sales of a specific item is decreasing, and a state in which the sales of a specific item exceeds (or is below) a target value.

Figure 4:
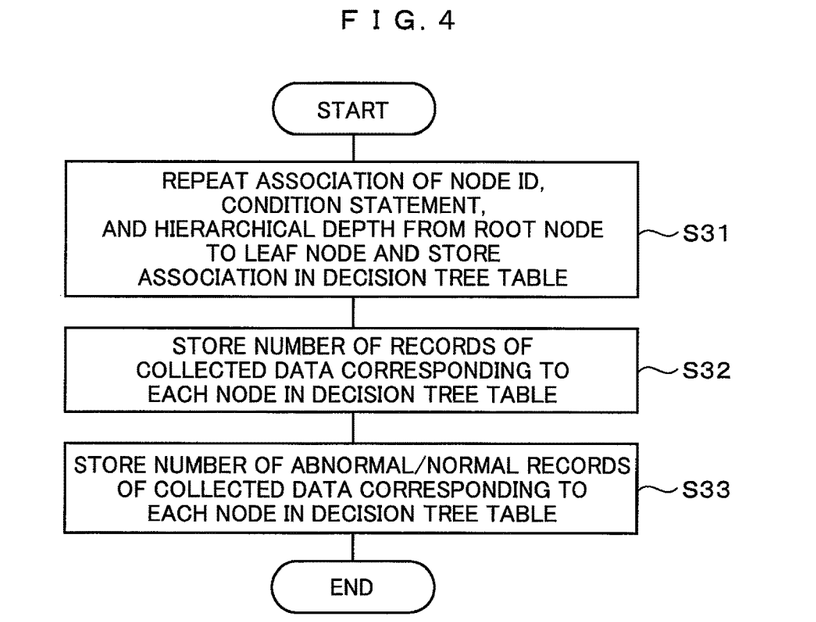
FIG. 4 is a processing flowchart of a decision tree generating unit.
Figure 5:
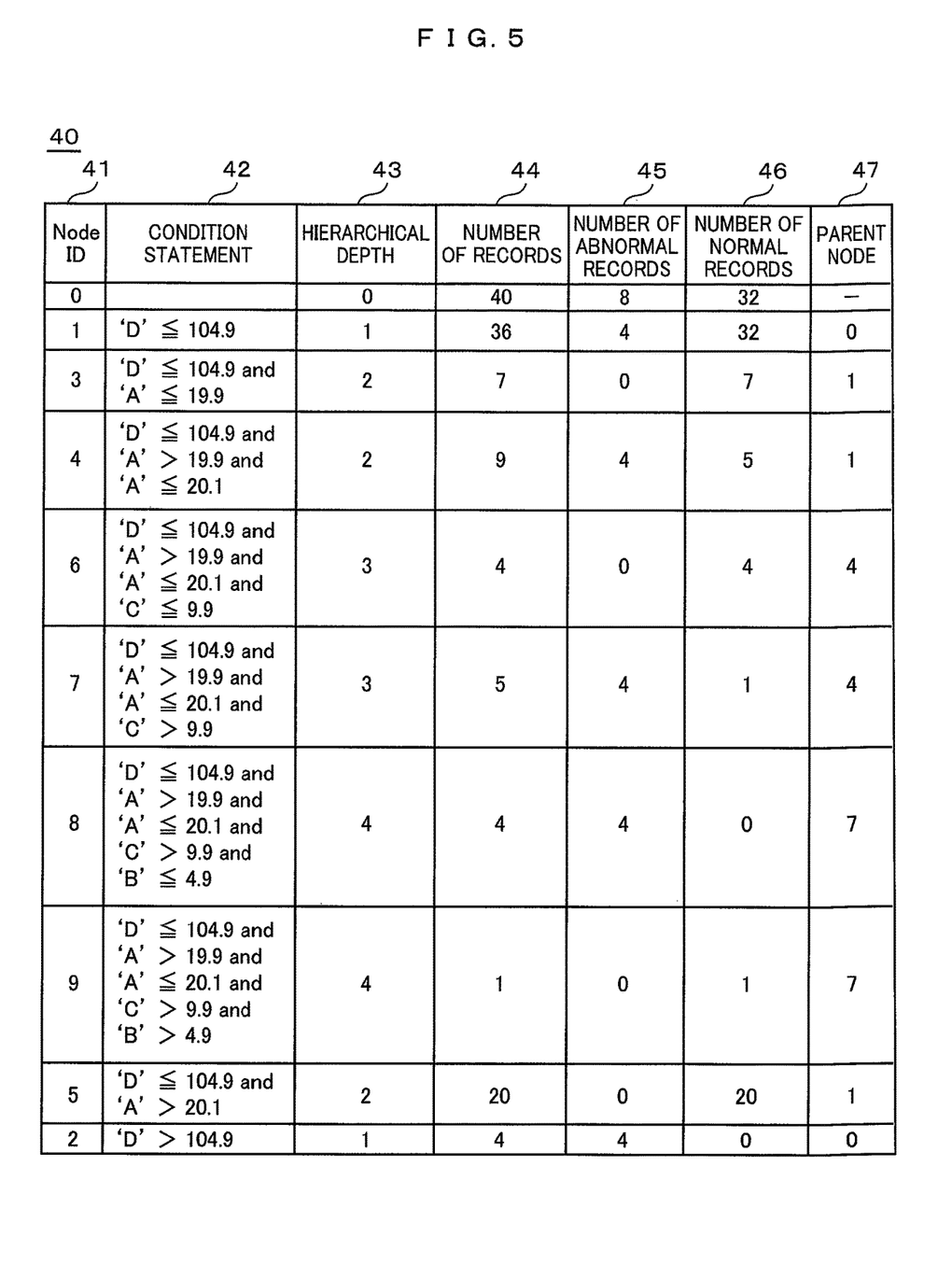
FIG. 5 is a configuration example of a decision tree table.

FIG. 4 is a processing flowchart of the decision tree generating unit 30. FIG. 5 illustrates a configuration example of the decision tree table 40 generated by the decision tree generating unit 30.

The decision tree table 40 includes a node ID 41 of each node of the decision tree, a condition statement 42 defining a node (a condition for determining whether or not a target record belongs to a node), a depth 43 of a node in a layer (of a tree structure) of the decision tree (a hierarchical depth: the number of branches from a root node to a corresponding node), the number of records 44 of collected data belonging to a node, the number of records 45 (the number of abnormal records) in which the state 26 of the collected data is indicated by "abnormal" among the records indicated by the number of records 44, and the number of records 46 (the number of normal records) in which the state 26 of the collected data is indicated by "normal" among the records indicated by the number of records 44, and a node ID 47 of a parent node from which a node is divided.

The decision tree generating unit 30 repeats an association of the node ID 41 of each node of the decision tree, the condition statement 42 defining the node, and the hierarchical depth 43 from a root node to a leaf node (a terminal node) and stores the association in the decision tree table 40 (S31). The root node includes all the records of the collected data table 20, and has the node ID 41 of "0" and the hierarchical depth 43 of "0." A node having the node ID 41 of "1" includes a record in which a value of the sensor D 25 in the collected data table 20 is equal to or less than 104.9 as indicated by the condition statement 42. On the other hand, the node having the node ID 41 of "2" includes a record in which the value of the sensor D 25 is greater than 104.9. Since the node having the node ID 41 of "1" and the node having the node ID 41 of "2" are located immediately under the node having the node ID 41 of "0," their hierarchical depth 43 is "1." Then, the association is repeated up to the leaf node in a similar manner.

An order of determinations for the condition statement 42 and references of each determination will be briefly described. In the decision tree analysis, in this example, the order of the determinations for the condition statement 42 is an order of determination for the value of the sensor D 25, determination for the value of the sensor A 22, . . . , but it is decided, for example, through a known chi-square test.

The determination criterion is a boundary value of the proportion of the number of records of the normal state/abnormal state indicated by the respective records. For example, on the basis of 104.9, the value of the sensor D 25 includes only the records of the abnormal state when it is larger than 104.9 (node 2), and includes both the records of the normal state and the records of the abnormal state when it is smaller than 104.9 (node 1). The node 1 is further divided into nodes 3 to 5 in accordance with the value of the sensor A 22. On the basis of 19.9 and 20.1, the value of the sensor A 22 includes only the records of the abnormal state when it is larger than 19.9 and less than 20.1 (node 4), and does not include the records of the abnormal state when it is smaller than 19.9 (node 3) or larger than 20.1 (node 5). Similar determinations are performed for other sensors on the basis of numbers illustrated in FIG. 5.

A division target node is attempted to be divided twice or more by employing the sensor data (explanatory variable) as the condition statement, and node division is performed using sensor data and values in which the proportions of the states (the normal state and the abnormal state) serving as the objective variable are well divided (divided into the node in which the proportion of the normal state is large and the proportion of the abnormal state is large) as the condition statement in which the division is actually performed. Further division of the divided nodes is repeated until a predetermined condition (a hierarchical depth of a node, the number of records in a node, the proportion of the normal state and the abnormal state, or the like) is satisfied.

The determination criterion is not necessarily based on a numerical value. In addition to a type in which a target level is output, a type in which a level is differentiated, and a change in a level is output as sensor data may be included as the sensor. For example, as a sensor that outputs a temperature change, there is a sensor that differentiates a temperature (level), and outputs an increase rate or a decrease rate, for example, steps such as five steps ("sudden increase," "increase," "no change," . . . ) as sensor data. In the case of such sensor data, a determination criterion corresponding to a numerical value or a character string indicating a step is used.

The decision tree generating unit 30 stores the number of records 44 of the collected data table 20 corresponding to each node of the decision tree table 40 in the decision tree table 40 (S32). The decision tree generating unit 30 stores the number of abnormal records 45 and the number of normal records 46 of the collected data table 20 corresponding to each node of the decision tree table 40 in the decision tree table 40 (S33). The number of records illustrated in FIG. 5 is a numerical value example when the number of records of the collected data table 20 is assumed to be 40.

Figure 6:
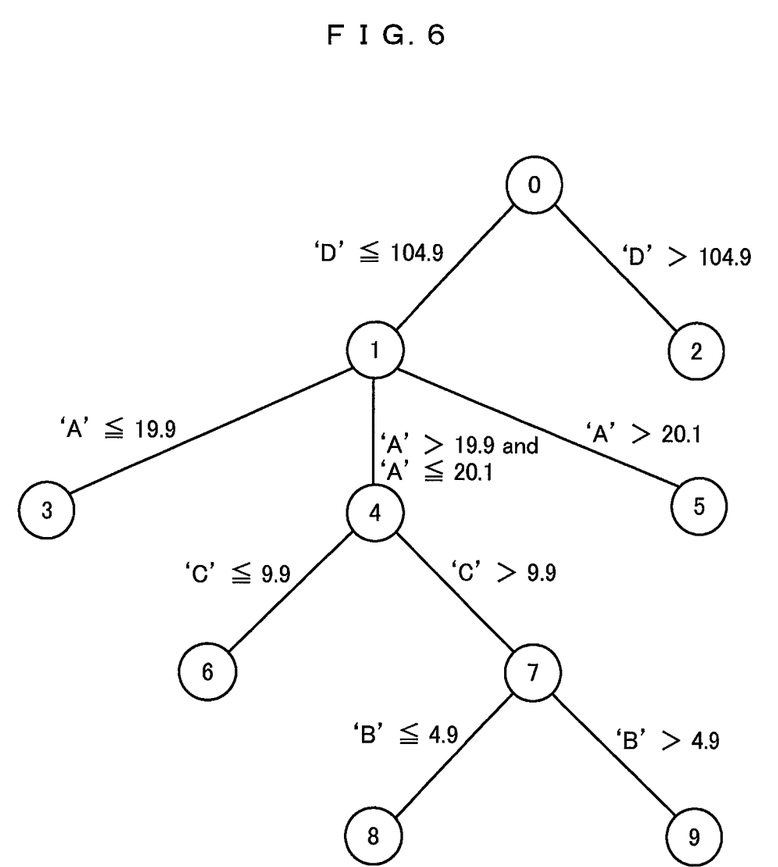
FIG. 6 is a diagram illustrating a decision tree with a tree structure.

FIG. 6 is a diagram illustrating content of the decision tree table 40 (decision tree) with a tree structure. In the decision tree indicated by the Tree structure, the root node (node ID 41="0": node 0) is located at the top, and the leaf node is located at each terminal. In each branch, the condition statement 42 from the upper node to the lower node is described. For example, the condition statement 42 of the node 8 (node ID 41-"8": the same hereinafter) is obtained by an AND condition of the condition of statements of the respective branches from the root node (node 0) to the node 8 via the node 1, the node 4, and the node 7.

The leaf nodes whose records included in FIG. 6 are all abnormal records are the node 2 and the node 8. This means that the state or the output of the analysis target system 2 is not necessarily specified by one rule (a type of sensor data or a combination thereof).

Figure 7:
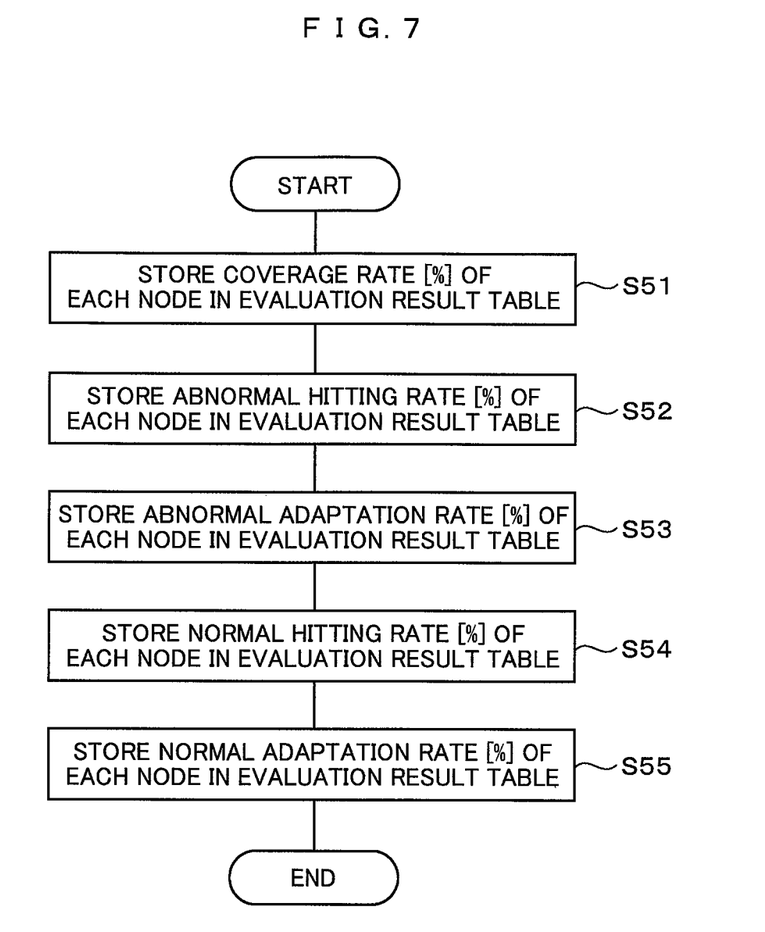
FIG. 7 is a processing flowchart of an evaluation value generating unit.
Figure 8:
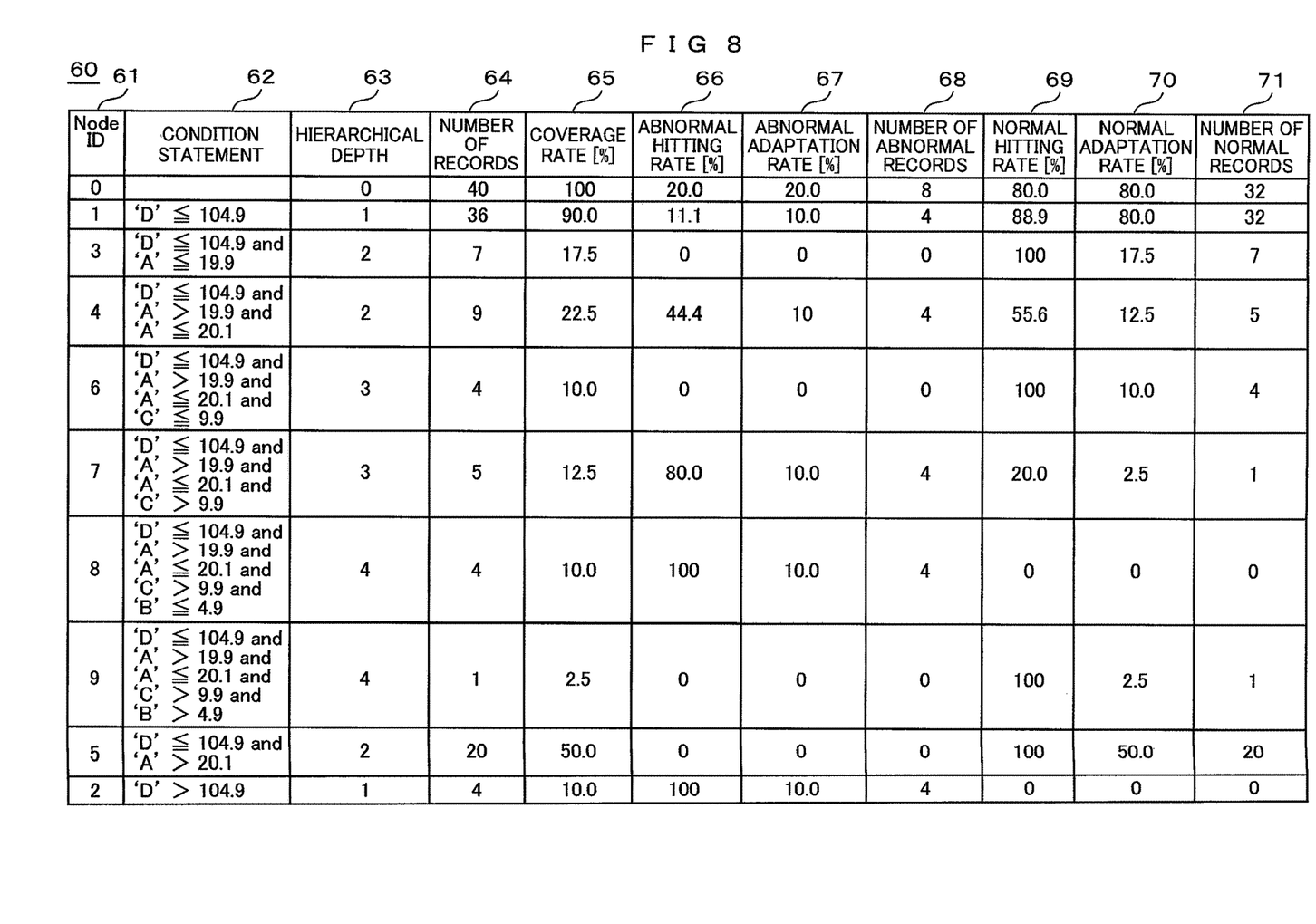
FIG. 8 is a configuration example of an evaluation result table.

FIG. 7 is a processing flowchart of the evaluation value generating unit 50. FIG. 8 illustrates a configuration example of the evaluation result table 60 generated by the evaluation value generating unit 50.

A node ID 61, a condition statement 62, a hierarchical depth 63, the number of records 64, the number of abnormal records 68, and the number of normal records 71 of the evaluation result table 60 are the same as the corresponding items of the decision tree table 40. For these items, the evaluation value generating unit 50 copies the content of the decision tree table 40 and generates the evaluation result table 60.

Further, the evaluation result table 60 includes a coverage rate 65, an abnormal hitting rate 66, an abnormal adaptation rate 67, a normal hitting rate 69, and a normal adaptation rate 70. The coverage rate 65 indicates the proportion of the number of records 64 included in the node to the number of all records (40) in the collected data table 20. For example, for the node 3, the number of records 64/the number of all records=7/40=17.5%. The abnormal hitting rate 66 indicates the proportion of the number of abnormal records 68 included in the node to the number of records 64. For example, for the node 4, the number of abnormal records 68/the number of records 64 of the node 4=4/9=44.4%. The abnormal adaptation rate 67 indicates the proportion of the number of abnormal records 68 included in the node to the number of all records (40). For example, for the node 4, the number of abnormal records 68/the number of all records of the node 4=4/40=10.0%. Since the normal hitting rate 69 and the normal adaptation rate 70 can be understood by replacing "abnormal" in the abnormal hitting rate 66 and the abnormal adaptation rate 67 with "normal," description thereof is omitted.

The abnormal hitting rate 66, the abnormal adaptation rate 67, the normal hitting rate 69, and the normal adaptation rate 70 are the evaluation values. The abnormal hitting rate and the normal hitting rate 69 are evaluation values indicating an index of accuracy of the rule according to the decision tree. The abnormal adaptation rate 67 and the normal adaptation rate 70 are evaluation values serving as a rough indication indicating the proportion of the number of abnormal records 68 or the number of normal records 71 included in the node to the number of all records. Therefore, the hitting rate may be referred to as an evaluation value.

The evaluation value generating unit 50 obtains the coverage rate 65 of each node as described above and stores the coverage rate 65 in the evaluation result table 60 (S51). As described above, the evaluation value generating unit 50 obtains the abnormal hitting rate 66 (S52), the abnormal adaptation rate 67 (S53), the normal hitting rate 69 (S54), and the normal adaptation rate 70 (S55), and stores the obtained rates in the evaluation result table 60.

Figure 9:
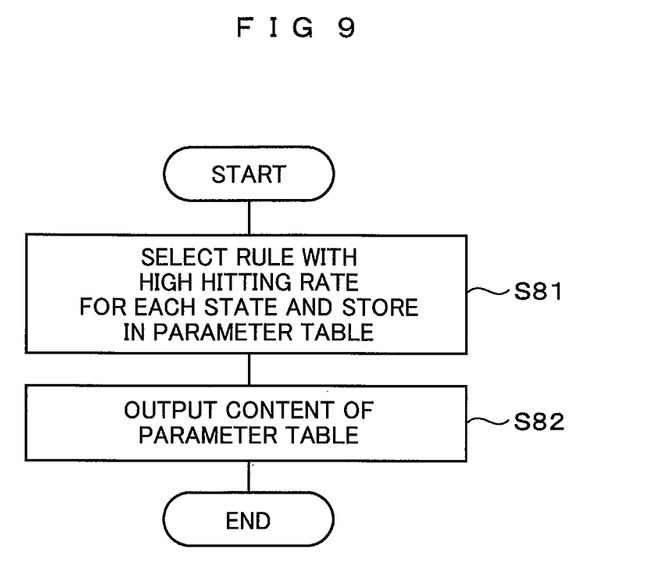
FIG. 9 is a processing flowchart of a parameter extracting unit.

FIG. 9 is a processing flowchart of the parameter extracting unit 80. Here, the parameter indicates each piece of sensor data reflected in each state (the above, normal) 26 serving as the objective variable, and the condition indicated by the condition statement 62 related to each piece of sensor data is a rule. Therefore, each rule includes the parameter (data) and the condition according to the parameter.

When a rule is selected, a selection criterion may be set in advance such as a rule having a hitting rate serving as an evaluation value of 100%, a rule having a hitting rate of a predetermined value or more, or a rule in which k hitting rates in the descending order are used, or a selection criterion may be set by the user of the data analysis device. Further, in addition to the hitting rate, a node which is large in the number of records may be preferentially selected in view of a value related to the number of records such as the number of records, the coverage rate, or the adaptation rate. It is because the node which is large in the number of records is considered to be important and reliable, and the node which is small in the number of records is considered not to be high in reliability or importance. Since the user of the data analysis device is able to check the rule with high importance using the selection criterion described as an example, a data analysis device capable of visualizing a feature inherent in sensor data without getting involved with unnecessary sensor data is obtained.

The parameter extracting unit 80 selects a rule with a high hitting rate for each state with reference to the evaluation result table 60, and stores the selected rule in the parameter table 90 (S81).

Figure 10:
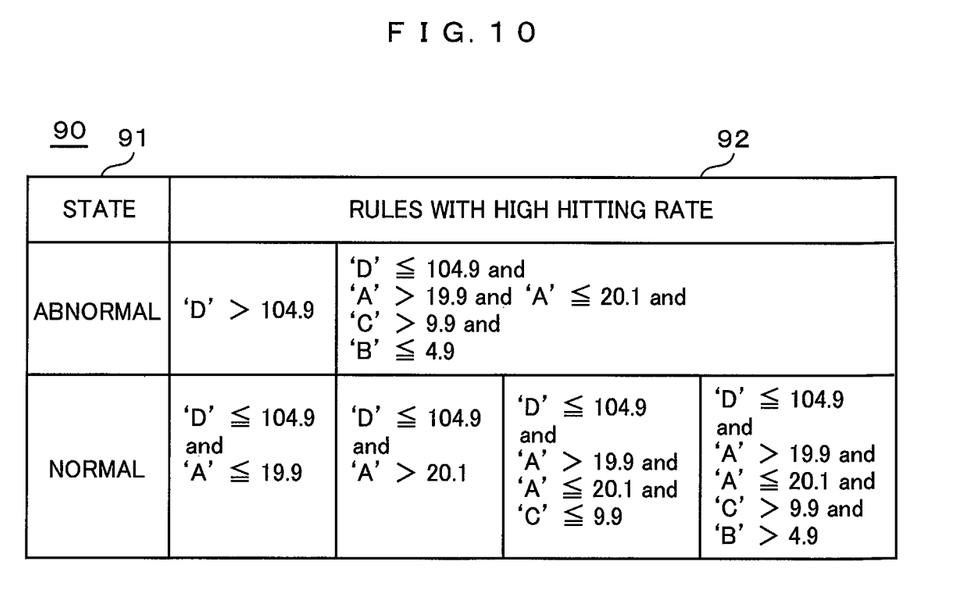
FIG. 10 is a configuration example of a parameter table.

FIG. 10 illustrates a configuration example of the parameter table 90. The parameter table 90 associates a state 91 with a rule 92 with a high hitting rate. The state 91 indicates "abnormal" or "normal," similarly to the state 26. As described above, the state 91 may be a variety of three or more states. Although illustrated as "high hitting rate," FIG. 10 illustrates an example in which "a rule with a hitting rate of 100%" is employed as a selection criterion in accordance with a state.

Specifically, a rule in which the abnormal hitting rate 66 of the evaluation result table 60 indicates 100% when the state 91 indicates "abnormal" corresponds to the node 2 and the node 8, and the condition statement 62 thereof is stored in the rule 92 with the high hitting rate. Further, a rule in which the normal hitting rate 69 of the evaluation result table 60 illustrates 100% when the state 91 indicates "normal" corresponds to the node 3, the node 5, the node 6, and the node 9, and the condition statement 62 thereof is stored in the rule 92 with the high hitting rate.

Further, in addition to the setting of only the hitting rate as the selection criterion, the selection criterion may be set to extract the condition statement of the node which is large in the number of records (the coverage rate and the adaptation rate) and high in the high hitting rate.

The parameter extracting unit 80 causes the content of the parameter table 90 to be output (displayed) on the output device 3 (S82). Since the content of the parameter table 90 output to the output device is the rule with the high hitting rate selected in accordance with a predetermined selection criterion, the user of the data analysis device is able to preferentially execute a procedure starting from a procedure corresponding to the rule with the high hitting rate, particularly, when the state of the system is abnormal.

Further, in addition to the operation of outputting the extracted condition statement (the parameter and its value) of each node without change, the parameter extracting unit 80 may extract an important parameter or calculate an importance of parameter. In the example of FIG. 10, the condition statement of the node which is high in the proportion of the normal state has parameters D and A, and the parameters D and A are most important, and a parameter C is next important. Further, it is also possible to digitalize the importance of each parameter on the basis of the hitting rate of the node, the number of records, or the like. The importance of the parameter may be extracted for each state (abnormal or normal) of the objective variable or may be extracted for all states.

According to the data analysis device described above, it is possible to visualize the feature inherent in the data in which the complication of the decision tree is solved as a rule. Particularly, since the user of the data analysis device is able to preferentially execute the procedure corresponding to the rule with the high importance (hitting rate) for the abnormal state of the system, it is useful as a system state monitoring technique.

REFERENCE SIGNS LIST 1 data analysis device
2 analysis target system
3 output device
10 data collecting unit
20 collected data table
30 decision tree generating unit
40 decision tree table
50 evaluation value generating unit
60 evaluation result table
80 parameter extracting unit
90 parameter table

The invention claimed is:

1. A data analysis device that analyzes data of an analysis target system having a plurality of sensors measuring physical characteristics of the analysis target system and a plurality of records each including an objective variable and a plurality of explanatory variables, comprising:
    a non-transitory storage device storing thereon a plurality of programs;
    a processor configured to execute the plurality of programs to perform the steps of:
        generating a plurality of nodes, each node specified by at least one condition of a plurality of conditions of the plurality of explanatory variables and the objective variable and associating the plurality of records with the plurality of nodes the plurality of explanatory variables corresponding to sensor data acquired from a plurality of sensors in the analysis target system and the objective variable indicating a normal or abnormal state of the sensor data for each record;

calculating, for each node, a plurality of evaluation values based on a first proportion of a number of records corresponding to the node with respect to a total number of records, a second proportion of the number of records corresponding to the node which satisfy the abnormal state of the objective variable, based on a combination of one or more conditions, to the number of records corresponding to the node, and a third proportion of records corresponding to the node which satisfy the normal state of the objective variable, based on the combination of one or more conditions, to the number of records corresponding to the node; and selecting a plurality of rules on the basis of the plurality of evaluation values and extracting and outputting conditions of the plurality of explanatory variables that are related to the selected rules; and controlling to display the selected rules including the conditions of the explanatory variables related to the selected rules along with a relative importance of conditions associated with the selected rules to visually display the relative importance of the plurality of conditions as a monitoring result, wherein the rules are selected on the basis of the evaluation values calculated, for each node, based on the second proportion of the number of records corresponding to the node which satisfy the abnormal state of the objective variable to the number of records corresponding to the node, and the third proportion of records corresponding to the node which satisfy the normal state of the objective variable to the number of records corresponding to the node, and by comparing the calculated evaluation values satisfying a first value and a second value with at least one predetermined criterion, and wherein the physical characteristics of the analysis target system measured by plurality of sensors include at least one of a medicinal substance insertion amount, a final component ratio of medicinal substances and temperature data, and wherein the analysis target system is a process management system that sequentially mixes and combines medicinal substances.

2. The data analysis device according to claim 1, wherein the processor further performs the step of generating each node through decision tree analysis.

3. The data analysis device according to claim 1, wherein the processor further performs the steps of:

receiving an input of one of the selected rules from a user based on the second proportion of the number of records corresponding to the node which satisfy the abnormal state of the objective variable to the number of records corresponding to the node;

performing control to execute a procedure based on the one selected rule on the analysis target system.

4. The data analysis device according to claim 1, wherein the analysis target system is a control system having the plurality of sensors.

5. A data analysis method in a data analysis device that analyzes data of an analysis target system having a plurality of sensors measuring physical characteristics of the analysis target system and a plurality of records each including an objective variable and a plurality of explanatory variables, comprising the steps of:

generating a plurality of nodes, each node specified by at least one condition of a plurality of conditions of the plurality of explanatory variables and the objective variable and associating the plurality of records with the plurality of nodes the plurality of explanatory variables corresponding to sensor data acquired from a plurality of sensors in the analysis target system and the objective variable indicating a normal or abnormal state of the sensor data for each record;

calculating, for each node, a plurality of evaluation values based on a first proportion of a number of records corresponding to the node with respect to a total number of records, a second proportion of the number of records corresponding to the node which satisfy the abnormal state of the objective variable, based on a combination of one or more conditions, to the number of records corresponding to the node, and a third proportion of records corresponding to the node which satisfy the normal state of the objective variable, based on the combination of one or more conditions, to the number of records corresponding to the node;

selecting a plurality of rules on the basis of the plurality of evaluation values and extracting and outputting conditions of the plurality of explanatory variables that are related to the selected rules; and controlling to display the selected rules including the conditions of the explanatory variables related to the selected rules along with a relative importance of conditions associated with the selected rules to visually display the relative importance of the plurality of conditions as a monitoring result, wherein the rules are selected on the basis of the evaluation values calculated, for each node, based on the second proportion of the number of records corresponding to the node which satisfy the abnormal state of the objective variable to the number of records corresponding to the node, and the third proportion of records corresponding to the node which satisfy the normal state of the objective variable to the number of records corresponding to the node, and by comparing the calculated evaluation values satisfying a first value and a second value with at least one predetermined criterion, wherein the selected rule including the conditions of the explanatory variables related to the selected rule is output for visual display as a monitoring result, and wherein the physical characteristics of the analysis target system measured by plurality of sensors include at least one of a medicinal substance insertion amount, a final component ratio of medicinal substances and temperature data, and wherein the analysis target system is a process management system that sequentially mixes and combines medicinal substances.

6. The data analysis method according to claim 5, further comprising the steps of:

generating, by the data analysis device, each node through decision tree analysis.

7. The data analysis method according to claim 5, further comprising the steps of:

receiving an input of one of the selected rules from a user based on the second proportion of the number of records corresponding to the node which satisfy the abnormal state of the objective variable to the number of records corresponding to the node; and performing control to execute a procedure based on the one selected rule on the analysis target system.

8. The data analysis method according to claim 5, wherein the analysis target system is a control system having the plurality of sensors.

\* \* \* \* \*